United States Patent [19]

Erickson

[11] Patent Number: 4,807,916
[45] Date of Patent: Feb. 28, 1989

[54] HANDLE FOR USE WITH ROLLABLE GARBAGE CANS

[76] Inventor: Herbert V. Erickson, 1219 S. Fife, Tacoma, Wash. 98405

[21] Appl. No.: 870,448

[22] Filed: Jun. 4, 1986

[51] Int. Cl.⁴ .......................... B66F 3/00; B62B 1/20
[52] U.S. Cl. .................................. 294/15; 280/47.26
[58] Field of Search ............... 294/15, 17, 4, 92, 27.1, 294/19.1, 26; 414/457; 280/47.17, 47.13, 47.26, 47.37 R; 16/114 R

[56] References Cited

U.S. PATENT DOCUMENTS

| | | | |
|---|---|---|---|
| 1,455,273 | 5/1923 | Sheen | 294/15 |
| 3,837,622 | 9/1974 | Gale | 294/15 |
| 4,135,725 | 1/1979 | DiRoma | 280/47.26 |

Primary Examiner—James B. Marbert
Attorney, Agent, or Firm—Kenneth S. Kessler

[57] ABSTRACT

A handle for use with rollable garbage cans is disclosed.

4 Claims, 1 Drawing Sheet

HANDLE FOR USE WITH ROLLABLE GARBAGE CANS

SUMMARY OF THE INVENTION

In order to gain better leverage and maneuverability on rolling garbage cans, the handle disclosed herein is securely positioned to the rollable can. The user first places the curved projection over the bar. Having accomplished this, the user tilts the bar backwards thereby abutting the ledge and brace of the handle against the lid.

Once the handle is in position, the user may tilt and maneuver the rollable garbage can with added ease based on the increased leverage gained by the length of the handle.

DETAILED DESCRIPTION OF THE DRAWINGS

Figure 1:
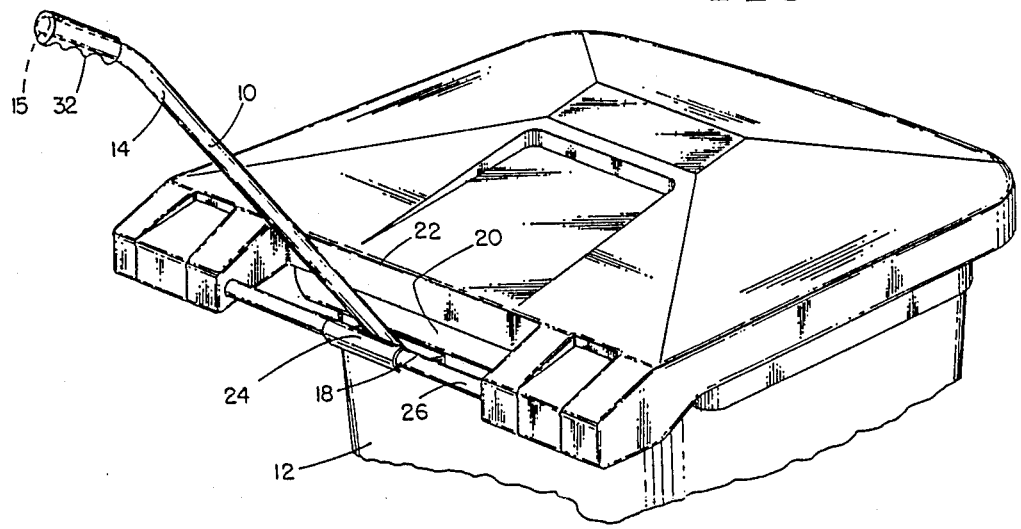
FIG. 1 is a perspective view of the handle in position to move a rollable garbage can.

A handle 10 for rollable garbage cans 12 is illustrated in FIG. 1 in position to guide and roll the can 12. The handle 10 extends to a height where it can be easily grasped. In addition, the handle extends rearward of the garbage can thereby providing space between the user and the can.

Figure 2:
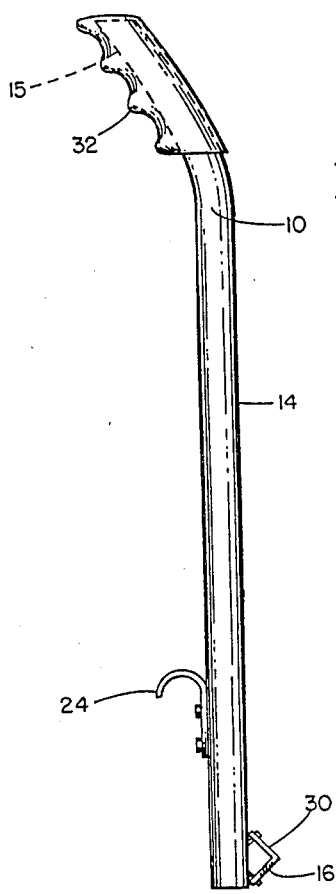
FIG. 2 is a side view of the handle for rollable garbage cans.

In FIG. 2 a side view of the handle is illustrated. A shaft 14 extends the full length. At one end of the shaft 14 is handle 15. At the opposing end of the shaft 14 is brace 16. The brace 16 is angled such that when the user pulls down on the handle, the brace 16 comes into contact with the lip 18 under the shoulder 20 of the lid 22 of a rollable garbage can.

Positioned toward the handle and attached to the shaft 14 is curved projection 24. The curved projection is designed to partially circumference the bar 26 of a rollable garbage can. The open end of the curved projection faces 180 degrees opposite the direction of the brace 16.

A brace 16 extends from the shaft, with the face 30 of the brace 16 on the opposite side of the shaft from the open end of the curved projection. The face 30 is of sufficient width to securely interface with the shoulder 20 of the lid 22. A grip 22 is affixed to the handle thereby increasing the ease in grasping the handle.

To better illustrate the handle 10, the steps of use will be discussed. The user inserts the brace 16 between the bar 26 and the lid 22. Also, the user places the curved projection about the bar 26. Once the curved projection circumferences the bar 26, the user tilts the handle back and causes the brace 16 to interface with the shoulder 20 of the lid 22. Once the handle is pulled back, the user can roll the garbage can for the front of the can is lifted and the can may be maneuvered on its wheels.

I claim:

1. A handle for rollable garbage cans having a bar for user guiding comprising:
    a shaft;
    a projection affixed at one end of the rod, said projection capable of abutting the shoulder of a garbage can;
    a curved projection capable of placement about a bar, said curved projection protrudes from the bar in a plan 180 degrees opposite the projection at the end of the rod; and
    a means for gripping the rod.

2. The handle of claim 1 wherein a brace extends from the shaft 180 opposite the curved projection, said brace extends capable of abutting the lid of a rollable garbage can when the curved projection is in position about the rollable garbage can bar.

3. The handle of claim 2 wherein the projection affixed at one end of the rod comprises a ledge, said ledge angled such that when the curved projection is positioned about the bar, the ledge comes into contact with the lip of a garbage can lid.

4. The brace of claim 2, wherein the brace comprises an "L" shaped bar.

* * * * *